May 10, 1949.   E. BODMER   2,469,761
CAM CONTROLLED PULSE TRANSMITTER

Filed June 18, 1945   3 Sheets-Sheet 1

Inventor
Ernest Bodmer
By [signature]
Attorney

Patented May 10, 1949

2,469,761

UNITED STATES PATENT OFFICE 2,469,761

CAM CONTROLLED PULSE TRANSMITTER

Ernest Bodmer, Grand-Lancy-Geneve, Switzerland

Application June 18, 1945, Serial No. 600,115
In Switzerland August 21, 1944

2 Claims. (Cl. 200—33)

There exist various record actuated devices for transmitting control signals in the form of electric impulses. Certain of these devices comprise a rotary member moving a perforated endless ribbon or a perforated drum, and rubbing contacts put on the drum, or a light source with photo-electric cells. When a contact registers with a perforation in the ribbon, or when a ray of light passes through a perforation, it causes an electric circuit to close which in general energises an electro-magnetic relay.

These devices are much used and offer certain advantages in the case where they control, for instance, a machine which must always carry out the same cycle of operations. Such devices are also advantageous when the machine must perform a limited number of cycles of different operations. But when the machine must carry out a great number of different cycles of operations or even when a particular cycle of operations is only used for a short limited time and never used again, it is evident that these devices no longer comply with practical requirements. In fact, for each such cycle of operations it is necessary to perforate a new ribbon, an operation which entails too much work in comparison with the little time that the ribbon will be used.

Besides that, for cycles of operations extending over a very long period of time and comprising operations of very brief duration, it is practically impossible to avoid an undesired repetition of such operations of brief duration, since the operation is terminated before the perforation has advanced far enough to prevent a new repeated but undesired order being sent for that operation.

Finally, other control devices have been proposed in which each displacement of a member is resolved into elementary displacements along the axes of coordinates of a system of three dimensions. For each displacement of each member, the number of impulses issued by the control station must be equal to the number of elementary displacements constituting the total displacement of the member. These devices have not given satisfaction because of the great complexity of the control circuits needed to control the displacement of a member.

The subject matter of the present invention is a device for transmitting control signals in the form of electric impulses, which tends to eliminate the drawbacks mentioned above by the fact that it is composed of several rotary members, each of which is rotated by one common shaft by means of lock-bolts fixing the angular positions of each rotary member with respect to the others, and by the fact that each rotary member includes at least one part intended for the control of an electric circuit.

Another object of the invention is to provide a keying part intended to control an electric circuit, which has a keying cam having a short dwell so arranged as to cause the transmission of a single current impulse of short duration in the electric circuit. Further this keying part may cooperate with the control member of an electric contact and may be constituted by a port or slit, allowing the rays emitted by a source of light to pass through and impinge on a photo-electric cell. Furthermore, this port or slit may cooperate with a control member, mechanically connected to an electric contact by means of a flexible coupling.

Still another object of the present invention is a device, in which the lock-bolts for fixing the rotary members may each be provided with a control member and may be displaceably mounted in bores provided in parts rigidly fixed to the shaft, each lock-bolt being urged by a spring tending to keep it in engagement with teeth carried by the discs, and each disc carries a graduated scale, which can be moved with respect to a register mark provided on a part rigidly connected to the shaft.

The accompanying drawing shows diagrammatically and by way of example two forms of embodiment of the subject matter of the present invention.

Figure 1:
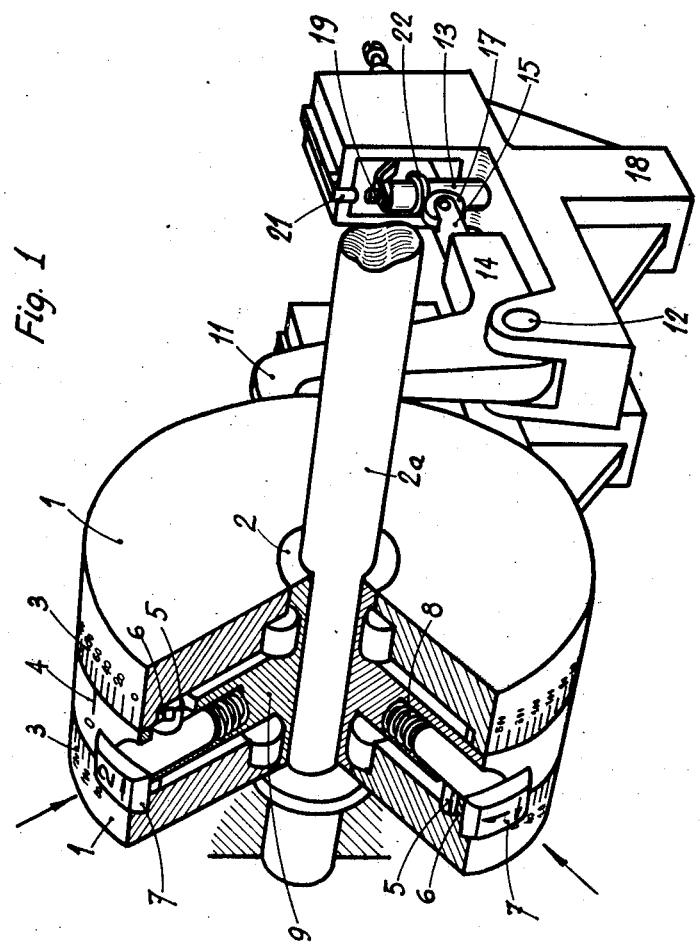
Fig. 1 is a view of one form of the invention in perspective with parts broken away.
Figure 2:
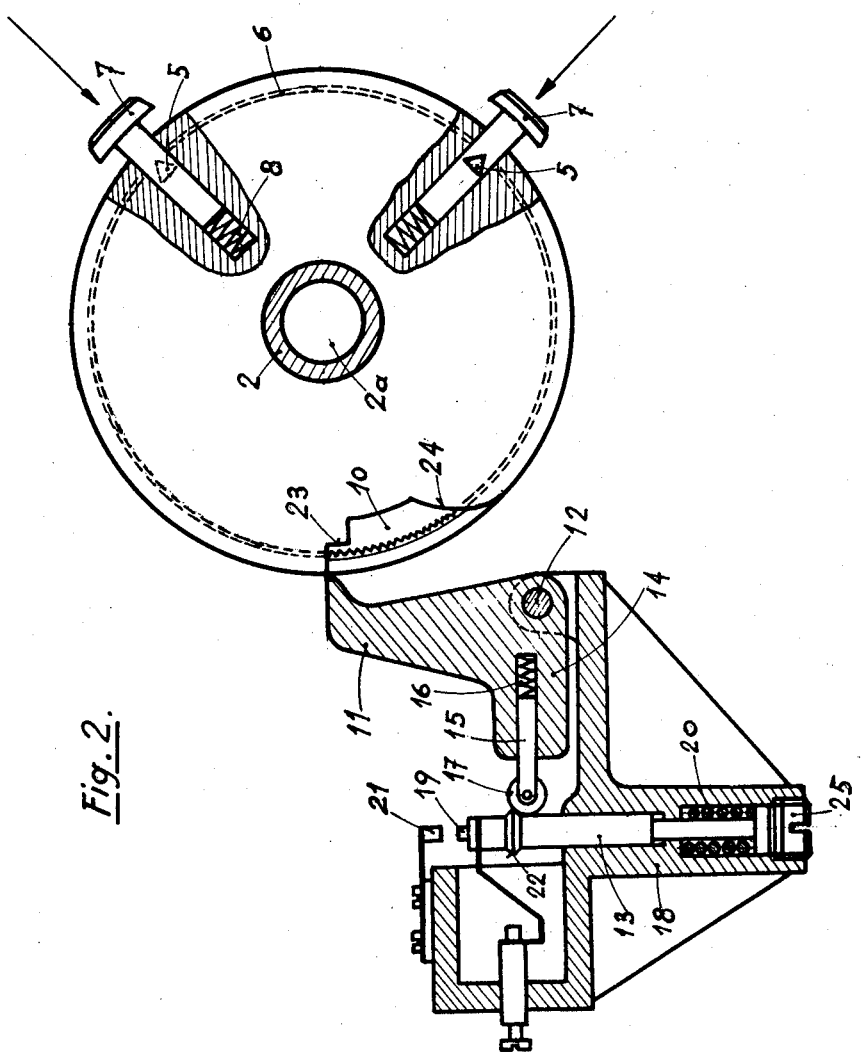
Fig. 2 is a partial side view of the embodiment of Fig. 1 with parts in section of the embodiment of Fig. 1.

In the form of embodiment shown in Figs. 1 and 2 of the drawing, the device comprises annular discs 1, freely rotatably mounted on a hub 2 rigidly connected to a shaft 2a. Each disc carries a graduated scale 3 which is mounted to move past a register mark 4. This latter is stamped on a part rigidly connected to the hub 2. Each disc 1 is rotated by the shaft 2a by means of a lock-bolt 5 urged by a spring 8 tending to keep it in contact with the internal teeth 6 of disc 1 whose pitch corresponds to the graduation of the scale. Each locking bolt carries a button or operating member 7.

In the form of embodiment shown in Figs.

1 and 2 the locking-bolts and the operating members are mounted in bores provided in shoulders 9 which are carried on the hub 2, while each disc carries internally a set of teeth 6. In a modified form of the device, the teeth may be rigidly connected to the shoulders, while the lock bolts and operating members can be mounted in bores provided in the discs.

Each disc has on its periphery a notch 10 with which a finger 11 cooperates; the finger is pivoted on a pinion 12 parallel to the shaft 2a.

This finger 11 is subjected to the action of a spring tending to make it enter the notch 10. The angular rotating displacements of this finger 11 upon falling into a notch 10 control the displacements of a rod 13. For this purpose, the finger 11 carries an arm 14, in a bore of which is slidably mounted a rod 15, urged by a spring 16 (Fig. 2). This rod 15 carries a roller 17. The latter is pressed by the spring 16 against the rod 13 which slides in a bore at right angles to the axis 12 in a support 18. This rod 13 carries a contact 19, connected to a source of electricity (not shown) and is urged by a spring 20 tending to withdraw the contact 19 from a second contact-piece 21 connected to the source of electricity. The rod 13 has a shoulder 22 which, in the normal position (the position shown), rests on the roller 17.

The device described above works as follows:

When the shaft 2a is rotated clockwise, the discs 1 are rotated by the lock-bolts 5 which are engaged with the teeth 6 on the inner periphery of disc 1. When the notch 10 of a disc 1 passes under a finger 11, the latter falls first on a step or dwell 23. This movement of the finger 11 causes the rod 13 to be urged upward against the force of its spring 20. The movement of the rod 13 is sufficient to close the contact 19—21 and thus allow a current to flow in the circuit which it controls. The shaft 2a continuing its movement, the finger 11 then slips off the step 23 and falls further to the bottom of the notch 10. The contact 21 opposing a further displacement of the rod 13, the roller 17 slips up over the shoulder 22 and the rod 13 is withdrawn by its spring 20. This displacement of the rod 13 causes the contacts 19—21 to separate and the current to cease to flow in the circuit which they control. A stop 25, whose position can be adjusted, limits the downward movement of the rod 13. Thus an order has been issued in the form of an impulse of electric current.

The shaft continuing to rotate, the finger 11 is pressed back against the action of its spring by a sloping surface 24 which extends from the bottom of the notch 10 to the circumferential periphery of the disc. The position of the adjustable stop 25 is chosen in such a way that, when the finger 11 slides along the circumferential periphery of the disc, the roller 17 is brought back onto the face of the shoulder 22 which is remote from the contact 19 (the position shown in the drawing).

In order to facilitate the passage of the roller 17 from one side of the shoulder 22 to the other, the faces of the shoulder 22 are sloped, being the sides of cones. To allow the roller 17 to pass on to the face of the shoulder 22 away from the contact 19, it is sufficient for the stop 25 to be adjusted in such a way that when the finger 11 is riding along the circumferential periphery of the disc 1, the plane passing through the axis of the roller 17 and at right angles to the rod 13 is situated on the side of the shoulder 22 away from the contact 19.

Since each disc can be set in the desired angular position with respect to the shaft 2a, it is easy to see that this device allows a current impulse to be sent in the course of one revolution of this shaft at the desired instant in each of the electric circuits controlled by a pair of contacts as 21—19. Each disc allows an order to be sent for performing one operation.

The device comprises as many rotary discs as the cycle of operations comprises separate operations to be performed. The angular velocity of the shaft carrying the discs is chosen in such a way that this shaft makes one complete revolution in the period of time corresponding to the duration of a complete cycle of operations.

It is evident that the notches made in the discs may be replaced by projections.

Figure 3:
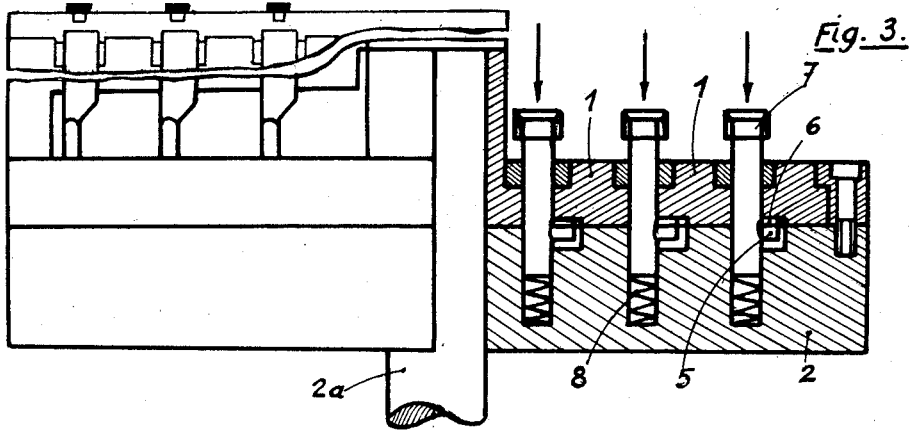
Fig. 3 is a side view of a modified form with parts in section.
Figure 4:
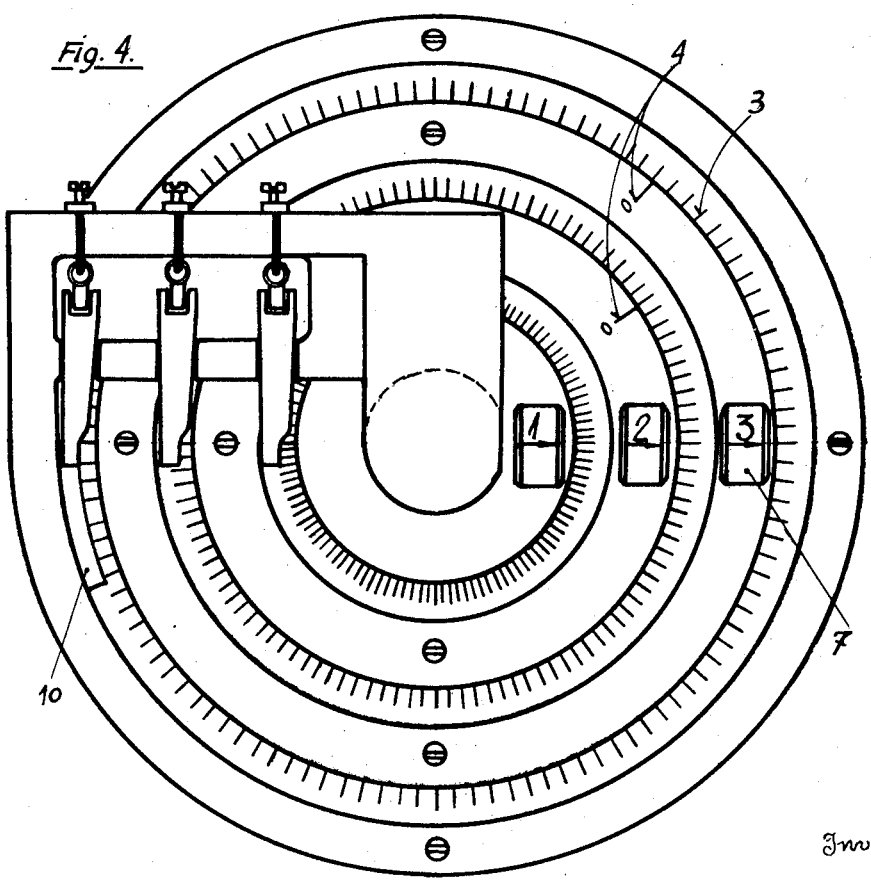
Fig. 4 is a front view of the form of Fig. 3.

In the modified form of the invention shown in Figs. 3 and 4, the device comprises a plurality of discs arranged concentrically to each other and each provided with a notch or a projection on one of their lateral faces.

In one modified form, each disc is hollowed out and one of its sides has a port or slit, allowing rays from a lamp to impinge on a photo-electric cell at a desired instant in order to control an electric circuit.

It is to be noted that, owing to the fact that the register marks 4 are fixed with respect to the hub 2, which itself is fixed to the driving shaft, while the graduated scales are located on the discs, the adjustment of the relative positions of the discs with reference to each other can be effected very easily and rapidly, provided that the register marks are situated so that they can all be seen at the same time. In fact, the adjusting of all the discs can then be effected for the same angular position of the driving shaft. The arrangement also allows of very easy checking of the setting of the discs.

From what has been said, it can be seen that to prevent the undesired repetition of an operation of very short duration, it is sufficient to make the step 23 so short, that the finger falls to the bottom of the notch before the end of the shortest operation. In other words, the angular length of this step must be smaller than the angular displacement of the rotating member during the time taken by the most rapid operation of the cycle of operations.

Having now particularly described and ascertained the nature of my said invention and in what manner the same is to be performed, I declare that what I claim is:

1. In a sequence switch, a pair of contacts, contact closing means normally in the open position and adapted to close said contacts, a cam disc have a peripheral cam surface, said contact closing means comprising cam engaging means engageable with said cam surface, a shaft, a hub fixedly carried on said shaft, and freely rotatably carrying said disc, and adjustable engaging means carried by said hub and engageable with said disc for adjustably determining the angular position of said disc on said hub, said adjustable engaging means comprising a bolt carrying a detent and being radially displaceably received within a radial bore of a shoulder of said hub and resilient means for normally urging said bolt radially outward, and said disc comprising an internal toothed rack adapted to lockingly receive said detent in a selected one of its teeth, said cam surface having a first short step dwell and a second step dwell successively more remote from the periphery of said disc, and said contact closing means comprising a contact carrying element and means actuatable by said cam engaging means and adapted to displace said element into contact closing position when said cam engaging means engages the first step dwell of said cam surface, and to release said element from contact closing position into starting position when said cam engaging means engages said second step dwell of said cam surface, the length of said first short step dwell corresponding to the desired length of closing of said contacts.

2. In a sequence switch, a pair of contacts, contact closing means normally in the open position and adapted to close said contacts, a cam disc having a peripheral cam surface, said contact closing means comprising cam engaging means engageable with said cam surface, a shaft, a hub fixedly carried on said shaft, and freely rotatably carrying said disc, and adjustable engaging means carried by said hub and engageable with said disc for adjustably determining the angular position of said disc on said hub, said adjustable engaging means comprising a bolt carrying a detent and being radially displaceably received within a radial bore of a shoulder of said hub and resilient means for normally urging said bolt radially outward, and said disc comprising an internal toothed rack adapted to lockingly receive said detent in a selected one of its teeth, said cam surface having a first short step dwell and a second step dwell successively more remote from the periphery of said disc, and said contact closing means comprising a contact carrying rod, means for normally urging said rod into the open contact position, a doubly beveled shoulder carried by said rod, and shoulder engaging means displaceably carried by said cam engaging means and resiliently urged into engagement with said shoulder, said rod and its shoulder and said shoulder engaging means being so positioned that said rod is displaced into contact closing means when said cam engaging means engages the first step dwell of said cam surface, and said rod is released from contact closing position into starting position by the passage of said shoulder engaging means over said shoulder when said cam engaging means engages said second step dwell of said cam surface, the length of said first short step dwell corresponding to the desired length of closing of said contacts.

ERNEST BODMER.

REFERENCES CITED

The following references are of record in the file of this patent:

UNITED STATES PATENTS

| Number | Name | Date |
|---|---|---|
| 1,851,247 | Hall | Mar. 29, 1932 |
| 1,880,105 | Reifel | Sept. 27, 1932 |
| 1,989,522 | McWhirter | Jan. 29, 1935 |
| 2,243,088 | Clark | May 27, 1941 |
| 2,394,142 | Breckenridge | Feb. 5, 1946 |